United States Patent [19]

Tanaka

[11] Patent Number: 4,734,784

[45] Date of Patent: Mar. 29, 1988

[54] IMAGE PROCESSING APPARATUS

[75] Inventor: Kanou Tanaka, Yokohama, Japan

[73] Assignee: Canon Kabushiki Kaisha, Tokyo, Japan

[21] Appl. No.: 78,028

[22] Filed: Jul. 28, 1987

Related U.S. Application Data

[63] Continuation of Ser. No. 737,045, May 23, 1985, abandoned.

[30] Foreign Application Priority Data

Jun. 5, 1984 [JP]  Japan ............................... 59-114824

[51] Int. Cl.⁴ .............................................. H04N 1/40
[52] U.S. Cl. ...................................... 358/283; 382/52
[58] Field of Search ............... 358/260, 280, 282, 283; 382/52, 53, 50

[56] References Cited

U.S. PATENT DOCUMENTS 4,547,811 10/1985 Ochi et al. ........................... 358/280

Primary Examiner—Edward L. Coles, Sr.
Attorney, Agent, or Firm—Fitzpatrick, Cella, Harper & Scinto

[57] ABSTRACT

An image processing apparatus comprises binarizing circuit for binarizing an input image data, selector for selecting a transmission destination of the binary signal from the binarizing circuit, and switching device for switching a binarization mode of the binarizing circuit in accordance with the selection by the selector.

15 Claims, 8 Drawing Figures

IMAGE PROCESSING APPARATUS

This application is a continuation of application Ser. No. 737,045 filed May 23, 1985, now abandoned.

BACKGROUND OF THE INVENTION

1. Field of the Invention

The present invention relates to an image processing apparatus suitable for use in electronic file, fascimile, reader or digital copier.

2. Description of the Prior Art

It has been proposed to photo-electrically read a document image by means of an image sensor such as a CCD or A-Si device, binarize the read signal by a threshold level, and reproduce an image by a binary printer (dot printer) such as a laser beam printer or ink jet printer. It has also been proposed to compress the binary read signal by a modified Huffman encoder for transmission or storage in a magnetic or optical memory.

In one method of converting the document image to the binary signal, the read signal is compared with a fixed threshold level to discriminate density (binarize), and in another method, each pixels in a predetermined pixel block (e.g. 4×4 pixels) is compared with a plurality of different threshold levels corresponding to a density between white and black and some pixels in the block are determined as black (or white) so that multi-tone image reproduction is attained.

The dither method is an effective technique because it allows multi-tone image reproduction with a relatively simple construction. However, the dither method has a drawback in that the resolution of the reproduced image is low. The fixed threshold binarization method provides a high resolution but cannot attain the tonality reproduction of the dither method.

In order to prevent the reduction of the resolution and attain the tonality reproduction, it has been proposed to divide the document image into a multi-tone reproduction area and a high resolution reproduction area and automatically or manually select the binarization processing in accordance with the content of the image such that the former area is processed by the dither method and the latter area is processed by the fixed threshold binarization method.

However, if image data binarized for reproduction on a sheet is to be stored in a file as it is, a problem may arise. The binary data for the reproduction on the sheet to represent exact densities are represented by a plurality of dots per pixel and cause the reduction of the compression factor in the dither method. Accordingly, a larger area of the file is required and the number of images stored in one image file such as a magneto-optical disk is reduced.

SUMMARY OF THE INVENTION

It is an object of the present invention to provide an image processing apparatus capable of selecting a binary processing method for an image data in accordance with an intended use.

It is another object of the present invention to provide an image processing apparatus which uses different binarization processing method in reproducing a document image and in filing the document image.

It is other object of the present invention to provide an image processing apparatus having an image discrimination function.

It is other object of the present invention to provide an image processing apparatus capable of selecting an image data processing mode in accordance with an output device used.

It is other object of the present invention to provide an image processing apparatus capable of selecting an appropriate processing mode with a relatively simple construction.

It is other object of the present invention to provide an image processing apparatus which improves a compression efficiency of an image data.

Other objects of the present invention will be apparent from the following description of the invention and the appended claims.

DETAILED DESCRIPTION OF THE PREFERRED EMBODIMENTS

Figure 1:
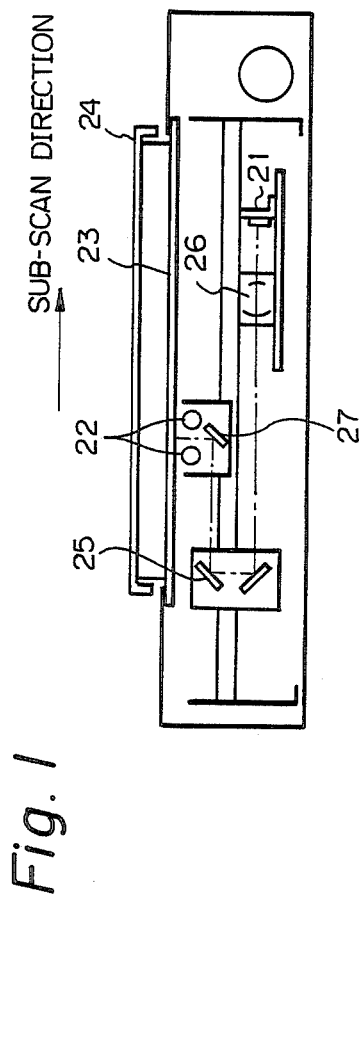
FIG. 1 shows a construction of a reader in accordance with the present invention.

FIG. 1 shows a construction of a document image reader in accordance with the present invention. A document is placed on a document glass in face-down fashion. A mounting reference position is on a left inner side as viewed from a front. The document is pressed to the document glass 23 by a document cover 24. The document is illuminated by a fluorescent lamp 22 and a reflected light therefrom is focused onto a CCD (image sensor) 21 having an linear array of a plurality of photo-sensors, through mirrors 25 and 27 and a lens 26. The mirrors 27 and 25 are relatively moved at a speed ratio of two. The optical unit is moved from left to right at a constant speed to subscan the document under a PLL control by a DC servo motor. A resolution in the sub-scan direction is 16 lines/mm.

In a main scan direction, a maximum main scan width is 257 mm which corresponds to a shorter width of a size B4 sheet. Because of the resolution of 16 pels/mm, 4112 (=257×16) bits are required for the CCD. In the present embodiment, a CCD array sensor having approximately 5000 photo-sensors is used to read the document.

The image of the document mounted on the document glass 23 is sequentially read line by line and the read signal is converted to a 6-bit digital image signal representing densities by an A/D converter (not shown). The digital image signal is binarized by a binarization circuit and compressed by a modified Huffman method and then stored in a file such as a magneto-optical disk or transmitted to a receiving device (such as a printer) through a transmission line.

Figure 2:
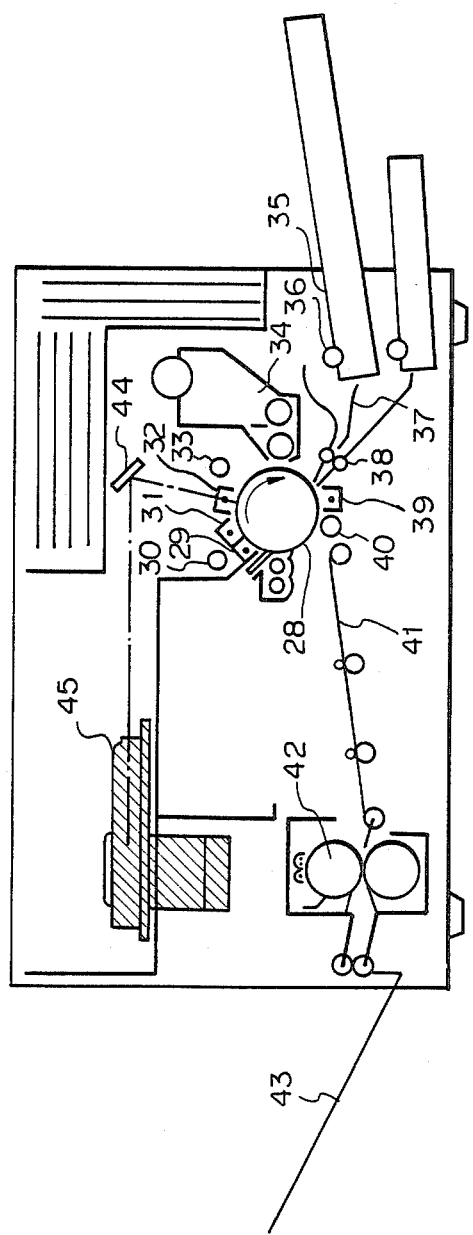
FIG. 2 shows a construction of a printer which prints in accordance with an image signal from the reader.

FIG. 2 shows a construction of a printer which prints in accordance with the compressed image signal transmitted from the reader shown in FIG. 1. The compressed image signal supplied through the transmission line is decompressed to a binary image data by a decompression circuit (not shown). The decompressed bit-serial image signal is supplied to a laser scan optical unit 45 of the printer. As will be explained later, when a copy mode is designated, non-compressed binary data is received from the reader. The unit 45 comprises a semiconductor laser, a collimator lens, a rotating polygon mirror, an F-θ lens and a correction optical system. The image signal from the reader is applied to the semiconductor laser where it is electro-optically converted, and the resulting laser beam is collimated by the collimator lens and directed to the polygon mirror rotating at a high speed. A photosensitive member (or photoconductor) 28 is scanned by the laser beam so that a latent image is formed on the photoconductor 28.

The photoconductor 28 may comprise three layers, a conductive layer, a photoconductive layer and an insulative layer. Process components for forming an image are arranged around the photoconductor 28.

Numeral 29 denotes a pre-discharger, numeral 30 denotes a pre-discharge lamp, numeral 31 denotes a primary charger, numeral 32 denotes a secondary charger, numeral 33 denotes a flat exposure lamp, numeral 34 denotes a developing unit for developing a latent image, numeral 35 denotes a paper cassette, numeral 36 denotes a paper feed roller for feeding a record paper from the cassette, numeral 37 denotes a paper feed guide, numeral 38 denotes a registration roller, numeral 39 denotes a transfer charger for transferring an image to the record paper, numeral 40 denotes a separation roller for separating the record paper from the photoconductor 28, numeral 41 denotes a convey guide, numeral 42 denotes a fixing unit, and numeral 43 denotes a tray. The image is formed on the record paper in accordance with the received image signal.

Figure 3:
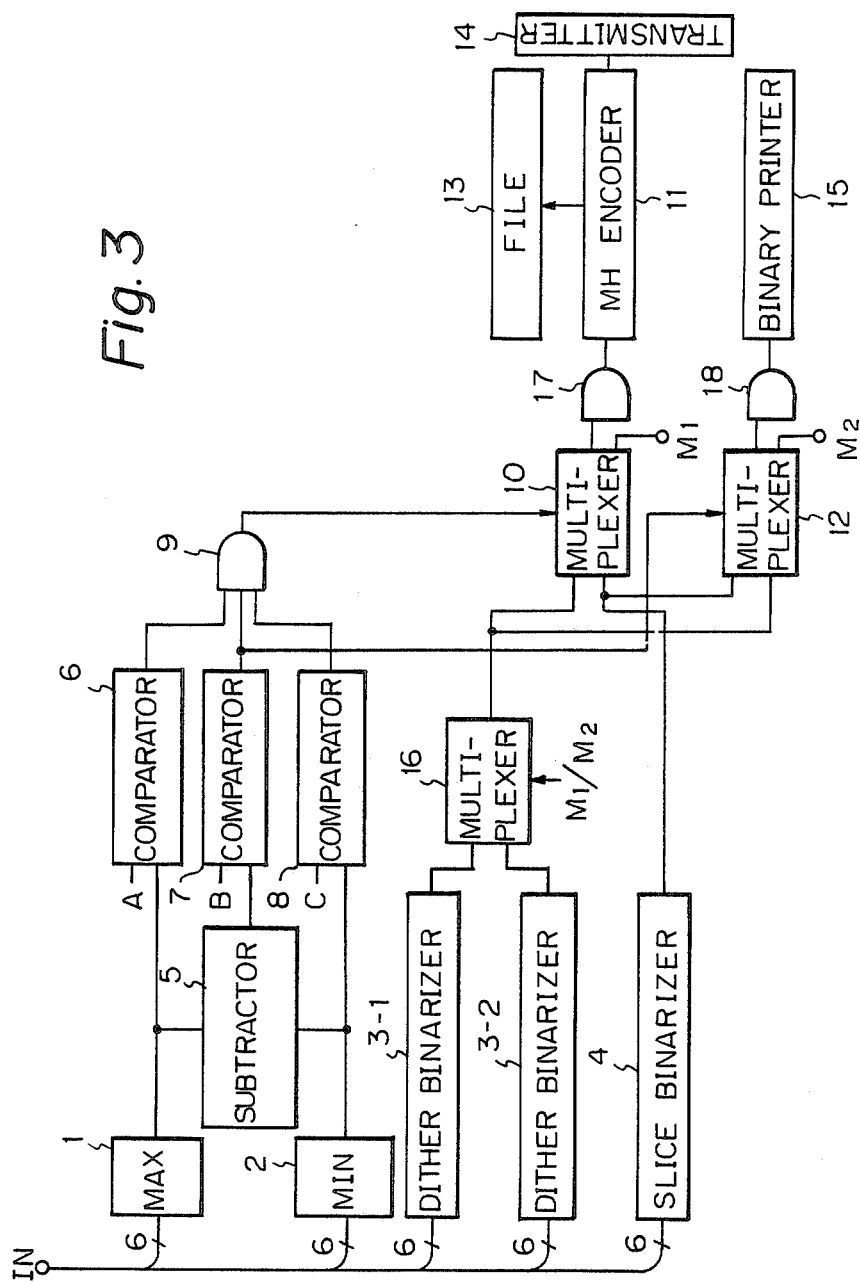
FIG. 3 is a block diagram of an image signal processing circuit.

FIG. 3 shows a block diagram of an image signal processing circuit in the reader shown in FIG. 1. The image signal of the document read by the image sensor 21 is converted to a 6-bit digital image signal by an A/D converter (not shown) and the digital image signal is applied to an input terminal IN. The digital image signal is supplied in parallel to a MIN detector 2, a MAX detector 1, dither binarization circuits 3-1 and 3-2 and a slice binarization circuit 44. The MAX detector 1 detects a maximum density in an 8×8-pixel area (0.5 mm square). When the main scan direction is along the shorter side of the size B4 sheet, the maximum density (block) of each area (black) is detected by a 1k×6 bits-memory and it is stored for each block. Similarly, the MIN detector 2 detects and stores a minimum density (white) of each area (block). The maximum and minimum densities of each block are read in synchronism with a ninth line main scan read.

The maximum density and the minimum density of the detectors 1 and 2 are supplied to a subtractor 5 where a difference therebetween is calculated to determine a density gradient. If the density gradient is smaller than a fixed 6-bit value B, that is, when the density difference is small, a comparator 7 supplies a "1" level output to an AND gate 9. If the output of the subtractor 5 is larger than the fixed value B, that is, if the density difference in the block is large, the block is determined to include a line image such as characters and the comparator 7 produces a "0" level signal.

In the prior art apparatus, the dither binarization circuit 3 for reproducing gray levels or the fixed slice (fixed threshold) binarization circuit 4 for reproducing the line image is selected by the output of the comparator 7. In the present embodiment, in addition to the output of the comparator 7, an output of a comparator 6 which produces a "1" level output when the maximum density is larger than a fixed valve A and an output of a comparator 8 which produces a "1" level output when the minimum density is smaller than a fixed value C are applied to an AND gate 9, which produces a "1" output only when all of those outputs are "1" to cause a multiplexer 10 to select the binary image data of the dither binarization circuit 3.

In other words, if the density gradient in the block is smaller than the fixed value B, the maximum density in the block is larger than the fixed value A and the minimum density in the block is smaller than the fixed value C, the block is determined as a gray level area and the AND circuit 9 produces the "1" output to select the output of the dither binarization circuit 3.

Numeral 11 denotes an MH encoder which encodes (compresses) the binary data by the modified Huffman method, numeral 13 denotes a page memory such as semiconductor memory or disk for a page or pages of the encoded data and numeral 14 denotes a transmitter such as a facsimile machine. The encoded data is serially transmitted by the transmitter 14 to a distant printer through a transmission line such as a telephone line.

Table 1 shows selections of the binarization methods in various cases in the present embodiment and the prior art system. The image density signal applied to the input terminal IN is a 6-bit (0 to 63) signal with a level 0 being a white level and a level 63 being a black level. The fixed values A, B and C applied to the comparators 6,7 and 8 are set to 6, 32 and 58, respectively.

TABLE 1

| | MAX | MIN | MAX-MIN | Selection | Selection in Prior Art System |
|---|---|---|---|---|---|
| ① | 50 | 10 | 40 | Slice | Slice |
| ② | 50 | 40 | 10 | Dither | Dither |
| ③ | 63 | 60 | 3 | Slice | Dither |
| ④ | 5 | 1 | 4 | Slice | Dither |
| ⑤ | 42 | 40 | 2 | Dither | Dither |

In the case ① in Table 1, the maximum density is 50 and the minimum density is 10. Thus, the comparator produces the "1" output because 50>A (=6) and the comparator 8 produces the "1" output because 10<C (=58). However, the comparator 7 produces the "0" output because 40>B (=32) and the gate 9 produces the "0" output so that the multiplexor 10 selects the output of the slice binarization circuit 4. That is, the block ① is determined as a line image.

In the cases ② and ⑤ the output of the dither binarization circuit 3 is selected because the density gradient is small and the maximum and minimum densities are in the half-tone area.

In the cases ③ and ④ the dither method is selected in the prior art system because the density gradient is small. In the present system, the slice binarization method is selected because the minimum and maximum densities are beyond C=58 and A=6, respectively. For the image which has a small density gradient but is offset toward black or white level as a whole, the compression efficiency is higher when the entire area is binarized than when it is dither-processed.

In the present embodiment, in addition to the density gradient which has been used in the prior art system as the image area discrimination reference, the maximum and minimum densities are also considered. Thus, the black image or the white image is not dither-processed and the compression efficiency in the MH coding is improved. The compression efficiency in the encoding is discussed below. In the case of ③ in Table 1, if the dither method is selected in the prior art system, at least three pixels in a unit area of a dither matrix are always discriminated as white assuming that there are 64 dither thresholds (0 to 63). If all areas along the main scan direction are ③, white data are scattered in continuous black data. In the modified Huffman encoding, if one line of the size B4 document is entirely black, one line information is represented by 40 to 50 bits code but if one white pixel is inserted in a center area, the code length is increased by approximately 20 bits. Accordingly, the image area discrimination and the binarization method relection means of the present embodiment significantly contribute to improve the compression efficiency in encoding the image signal.

When no compression is required such as when mere copying function is required and the black or white pixel does not significantly affect the efficiency, only the output of the comparator 7 may be used to select the binarization method. In this case, a multiplexor 12 which receives the outputs of the dither binarization circuit 3 and the slice binarization circuit 4 is provided and the multiplexor 12 is conditioned by the output of the comparator 7 and the selected binary image signal is supplied to a binary printer 15 such as a laser beam printer. The dither binarization circuits 3-1 and 3-2 and the slice binarization circuit 4 each has a memory (RAM) of an 8-line capacity, for example, for storing the processed binary data in order to synchronize it with the image data discrimination operation.

In the present embodiment, one of the two binaried signals is selected by the output of the AND gate 9. Alternatively, fixed slice levels may be stored in a ROM which contains a dither pattern for producing a compare signal of the image signal in the comparator and the ROM output may be selected by the output of the AND gate 9. That is, either the dither pattern or the fixed threshold may be selected by the output of the comparator 9. A table in a memory which is addressed by the image signal to produce a corresponding binary output may be selected by the output of the AND gate 9. (Selection of the dither processing table or the slice binarization table). The circuit of FIG. 3 may be applied to the binarization of a data other than that read from the document, such as a transmitted data. The slice levels of the comparators are not limited to those used in the present embodiment.

In the embodiment of FIG. 3, the condition that the difference between the maximum density and the minimum density in the unit area is within the predetermined range is added so that the dither processing is selected only when the maximum density in the unit area is higher than the predetermined level and the minimum density is lower than the predetermined level. By a characteristic of the compression processing by the modified Huffman method, the code length of the compressed code is longer when one-bit white signals are scattered in a continuous black signal than when black signals are scattered in a continuous white signal. Accordingly, the binarization/dither discrimination circuit shown in FIG. 3 can be simplified in a manner shown in FIG. 4 in which an image having continuous black level pixels is dither processed to avoid the scattering of the white signals in the continuous black signal, which significantly affects to the compression efficiency.

Figure 4:
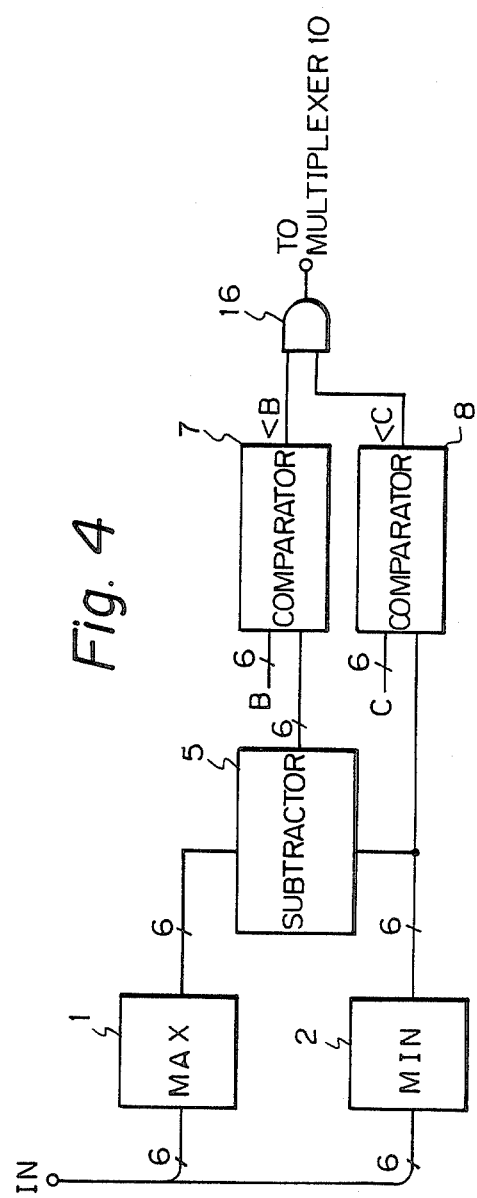
FIG. 4 is a block diagram of another image signal processing circuit.

In FIG. 4, the like numerals to those shown in FIG. 3 designate the like elements. A difference from the circuit of FIG. 3 is an omission of the comparator 6 which compares the output of the MAX detector 1 with the fixed value A. Accordingly, a two-input AND gate 16 is used in place of the three-input AND gate 9 which produces a select signal to the multiplexor 10.

The image near the block level, which may possibly impose a significant affect to the compression efficiency is not dither-processed but slice binarization-processed, and the image near the white level which does not relatively affect to the compression efficiency is not suppressed for the dither processing.

The circuit of FIG. 4 can improve the compression efficiency and simplify the circuit configuration. Depending on the characteristic of the compression system, the comparator 6 which compares the output of the MAX detector 1 with the fixed value A may be provided and the comparator 8 which compared the output of the MIN detector 2 with the fixed value C may be omitted.

As described above, the binarization processing is carried out in accordance with the content of the image without dither-processing a wide black or white area on the document. When the binary data is compressed, the compression efficiency is improved and the transmission time is shortened.

In FIG. 3, when the binary data is to be compressed by the MH encoder 11 and filed in the magneto-optical disk, it is binarized by an 8×8 matrix dither pattern which is different from the conventional 8×8 matrix dither pattern and which has a threshold array arranged to prevent adverse affect to the compression efficiency, in order to file the image data without lowering the compression efficiency and with the half tone of the document image being reproduced. When a key to select a file mode $M_1$ is depressed, the multiplexor 16 selects the dither binarization circuit 3-1 and the data binarized by the threshold pattern which does not cause the reduction of the compression efficiency is supplied to the multiplexor 10. The binary data from the circuit 3-1 is supplied to the MH encoder 11 by the gate 17 which is conditioned by the file mode $M_1$ input, it is runlength encoded and MH-encoded, and the compressed data is supplied to the file 13 such as a magneto-optical disk. The slice-binarized area and the dither-binarized area are mixedly filed. The data sequentially read from the documents which are automatically fed and replaced in the reader and binarized are sequentially stored in the file 13. The circuits 3-1 and 3-2 may be selected by a transmission mode $M_3$ and a copy mode $M_2$ respectively. In the transmission mode $M_3$ the dither binarization circuit 3-1 is selected as is done in the file mode $M_1$ so that the binary data is efficiently compressed by the MH encoder 11. Thus, the transmission time of the encoded data transmitted by the transmitter 14 is shortened.

When the copy mode $M_2$ selection key is depressed, the multiplexor 16 selects the circuit 3-2 and the data binarized by, for example, a spiral dither pattern is supplied to the binary printer 15 through the gate 18. The printer prints the data by one dot per pixel. When the copy mode $M_2$ is selected, only the output of the comparator 7 is valid and the binary data is supplied to the printer 15 through the multiplexor 12 and the AND gate 18.

The data filed in the file 13 can be read out again, decoded by an MH decoder and printed by the binary printer 15.

A density pattern method for converting a one-pixel density to a multi-bit data has been known. A converter (not shown) which uses the density pattern method may be provided so that the data binarized by the converter is selected in the copy mode and sent to the binary printer 15. When the file mode $M_1$ is selected, the converter is not selected but the dither binarization circuit or the slice binarization circuit may be selected to improve the compression efficiency. This may also be applied when the data from the encoder 11 is transmitted.

In the embodiment of FIG. 3, the image discrimination circuit comprises the MAX detector 1, MIN detector 2, subtractor 5, comparators 6, 7 and 8 and AND gate 9. An image discrimination circuit which can be used in the present embodiment is explained in detail with reference to FIGS. 5 to 7.

Figure 5:
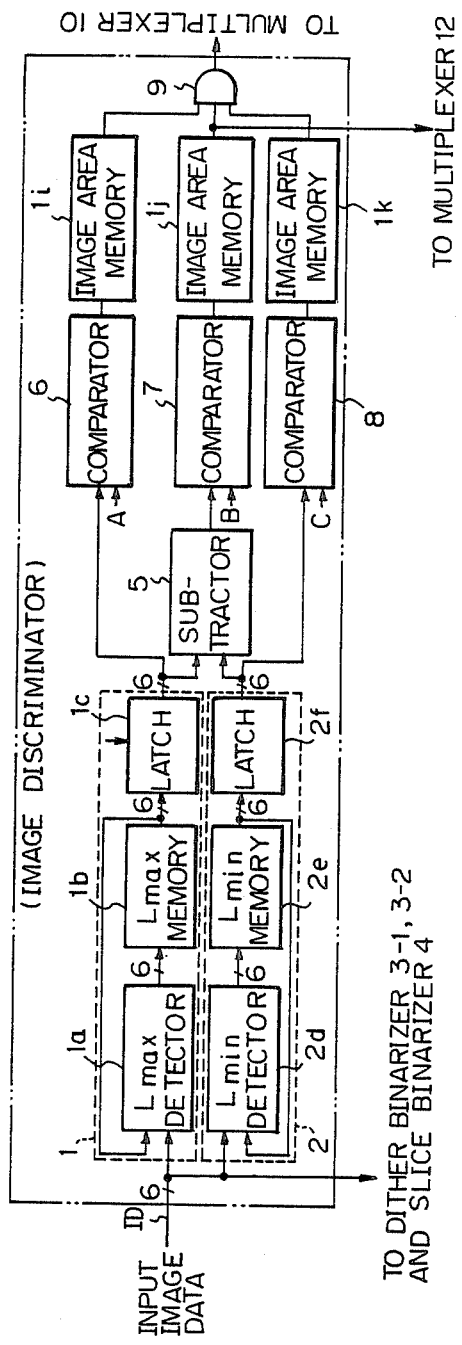
FIG. 5 shows a detail of an image discrimination circuit.

FIG. 5 shows the image discrimination circuit in which ID denotes an image data signal which is a 6-bit parallel signal. Numeral 1a denotes a MAX detector which detects a maximum pixel density (L max) in each block, and numeral 1b denotes a MAX memory which stores therein an output from the MAX detector 1a and stores 6-bit density level information for each of blocks which are equal in number to the number of pixels in one main scan line divided by light. The output from the MAX memory 1b is fed back to the input of the MAX detector 1a to allow comparison of the L max in the block of one main scan line older with the pixel density of the current main scan line. The output of the MAX memory 1b is also supplied to a subtractor 5 through a latch 1b. Numeral 2d denotes a $M_2N$ detector which detects a minimum pixel density (L min) in each block and numeral 2e denotes a MIN memory which stores therein an output from the MIN detector 2d. The output from the MIN memory 2e is supplied to a latch 2f and fed back to the input of the MIN detector 2d to allow the comparison of L min in the block of one main scan line older with the pixel density of the current main scan line. The subtractor 5 calculates a difference between the output L max from the latch 1c and the output L min from the latch 2f, that is, (L max−L min), and numeral 7 denotes a comparator which comperes the difference (L max−L min) calculated by the subtractor 5 with a preset image discrimination parameter B. A compare result from the comparator 7 is stored in an area memory 1j. The maximum density and the minimum density in the block are compared with parameters A and C by comparators 6 and 8, respectively, and the compare results are stored in area memories 1i and 1k, respectively. The outputs from the area memories 1i, 1j and 1k are supplied to an AND gate 9.

The overall operation is first explained. Assuming that the document is main-scanned and subscanned to read the image in 64 tone levels, a 6-bit image data is produced for each pixel and an A/D converter (not shown) produces an image data signal which is a 6-bit parallel signal. The image discrimination circuit divides the image into 8×8-pixel blocks, detects L max and L min for each block, calculates (L max−L min), and compares (L max−L min) with the image discrimination parameter B to classify the image into the binary (non-gray level) representation area and the gray level representation area.

When (L max−L min)≧B(=32), the binary representation area is selected, and when (L max−L min)<B, the gray level representation area is selected. The result is stored in the image area memory in the image discrimination circuit. The binary representation area is represented by "0" and the gray level representation area is represented by "1". The memories in the dither binarization circuits 3-1 and 3-2 and the slice binarization circuit 4 serve to delay the processed binary data to synchronize then with the output of the image discrimination circuit.

Figure 6:
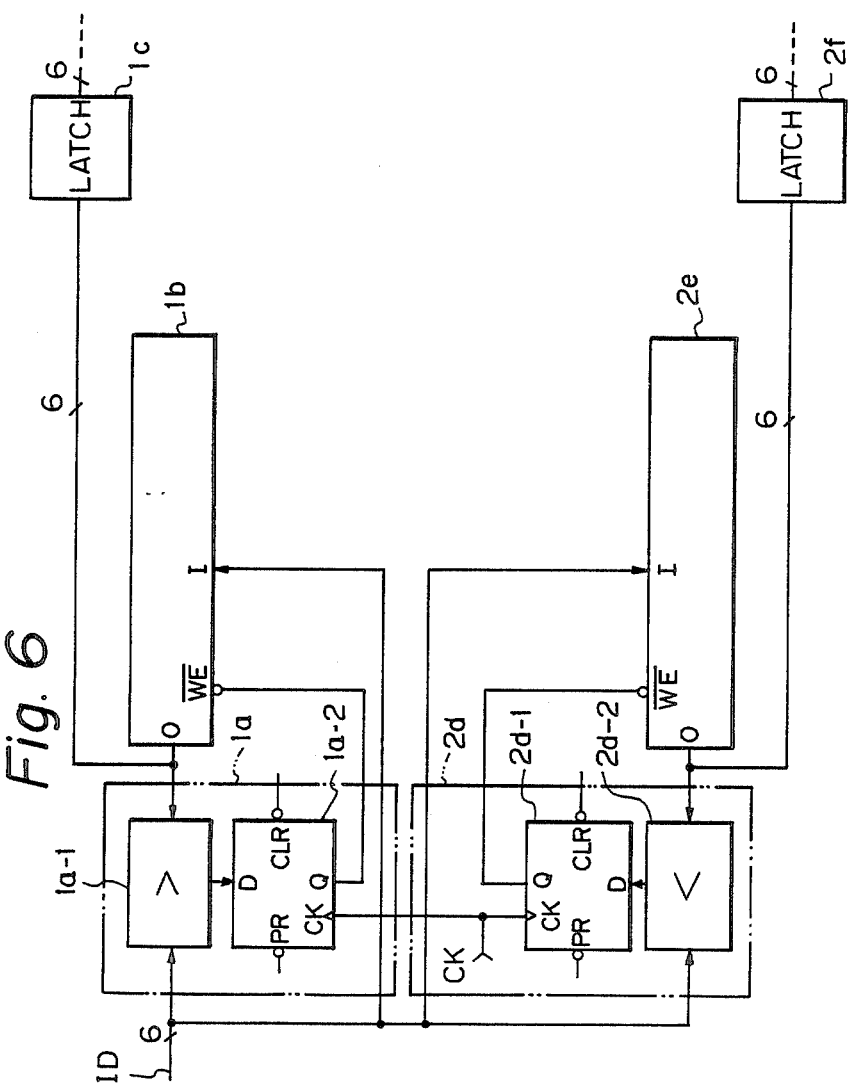
FIG. 6 shows a detail of a MAX detector $1a$, MAX memory $1b$, MIN detector $2d$ and MIN memory $2e$.

FIG. 6 shows a detaile of the MAX detector 1a, MAX memory 1b, MIN detector 2d and MIN memory 2e. Numerals 1a-1, and 2d-2 denote comparators, and numerals 1a-2 and 2d-1 denote flip-flops (F/F). The RAM 1b, comparator1a-1 and F/F 1a-2 divide the 6-bit image density data into 8×8-pixel unit blocks and detect the maximum pixel density L max in each block.

Figure 7:
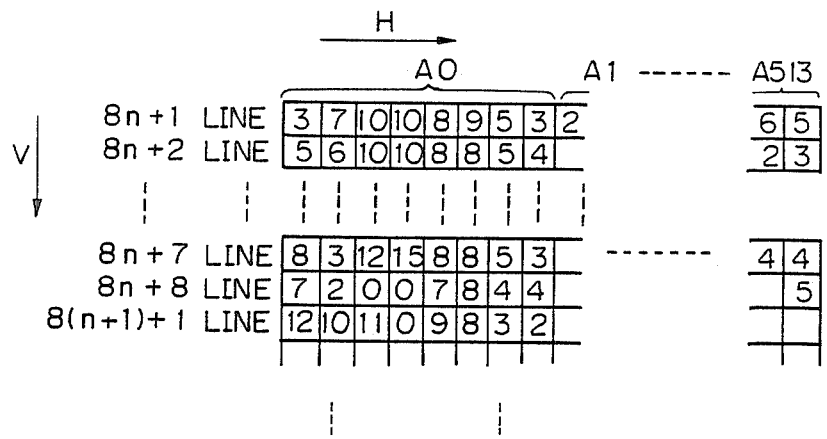
FIG. 7 shows pixel densities of a document.
Figure 8:
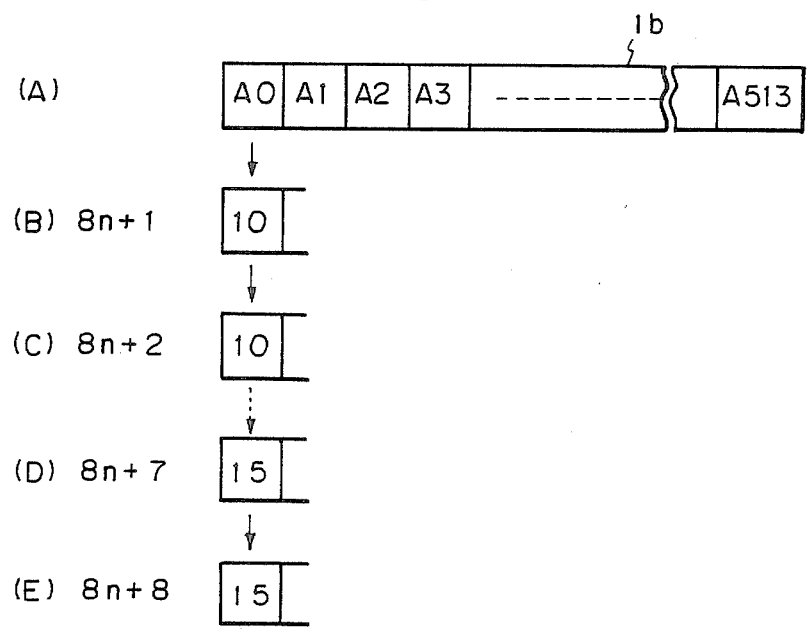
FIG. 8 shows areas of the MAX memory $1b$.

The detection of L max is explained with reference to FIGS. 7 and 8. FIG. 7 shows pixel densites read by a solid-state image sensor such as a CCD, converted to the digital signal by an A/D converter (not shown) and arranged to correspond to the document image. FIG. 8 shows a memory area of the MAX memory 1b. As shown in FIG. 8(A), the MAX memory 1b has a space to store therein the image data which is read at 16 pixels/mm in the main scan direction for the document having a length of 257 mm in the main scan direction and which is divided into 8-pixel groups, that is, the data corresponding to image areas A 0 to A 513.

In FIG. 7, arrows H and V indicate the main scan direction and the sub-scan direction of the document, respectively. A0, A1, . . . denote unit blocks (image areas) each containing 8×8 pixels (=64 pixels).

Let us assume that when the CCD main-scans the (8n+1)th line, image data ID 3→7→10→10→8→9→ . . . are sequentially supplied to the comparator 1a and the MAX memory 1b. The comparator 3a-1 compares the sequentially supplied image data with the data stored in the MAX memory 1b, and if the supplied image density is higher, the output of the comparator 1a-1 is held by the F/F 1a-2 and the MAX memory 1b is set to the write mode.

When the first data on the (8n+1)th line is supplied to the comparator 1a-1, it is unconditionally written into the MAX memory 1b as an initial value in the image area in which the data is included. In FIG. 3, the density data "3" is the initial value for the image area A0, and the data "2" is the initial value for the image area A1.

In the image area A0, when the next data "7" on the (8n+1)th line is supplied to the comparator 1a-1, the initial value "3" stored in the MAX memory 1b is read out and they are compared. Because 7>3, the content of the MAX memory 1b is updated from "3" to "7".

Similarly, when the next data "10" is supplied, the content of the MAX memory 1b is again updated. At the end of the transfer of the 8-pixel data contained in the image area A0 on the (8n+1)th line, the maximum value "10" in the eight pixels is stored at the address corresponding to the image area A0 on the memory area of the MAX memory 1b, as shown in FIG. 8(B).

The above steps are repeated 514 times for all image areas on the (8n+1)th line. At the end thereof, 514 data are stored at the respective addresses of the MAX memory 1b as the maximum densities L max of the image areas on the (8n+1)th line.

In the scan of the (8n+2)th line, the image data are sequentially compared with the maximum densities of the corresponding image areas on the (8n+1)th line. Thus, at the end of the processing of the (8n+2)th line, the data "10" is stored as the maximum density in the area of the MAX memory 1b corresponding to the image area A0, as shown in FIG. 8(C).

Similarly, at the ends of processing of (8n+7)th line and (8n+8)th line, the data "15" is stored as shown in FIGS. 8(D) and 8(E). It is assumed that there is no data which is larger than "15" in the image area A0 from the (8n+3)th line to (8n+6)th line in FIG. 7.

The detected data "15" is set as the maximum density L max in the image area A0, and in the processing of the {8(n+1)+1}th line, it is read from the MAX memory 1b and supplied to the subtractor 5 through the latch 1c before the initial value "12" is written into the same address of the MAX memory 1b.

The MIN memory 2e, comparator 2d-2 and F/F 2d-1 detect the minimum density L min in the image area in the same manner as the MAX memory 1b, comparator 1a-1 and F/F 1a-2 detect the maximum density L max.

The present embodiment is not restricted to the illustrated embodiments and various modifications may be made within a scope of the appended claims.

What is claimed is:

1. An image processing apparatus comprising:
   image data input means;
   processing means for processing the image data inputted from said image data input means to produce a reproduction signal, said processing means being capable of processing the image data in at least several processing modes;
   selection means for selecting a transfer destination of the reproduction signal from said processing means; and
   switching means for switching the processing mode of said processing means in accordance with the selection by said selection means.

2. An image processing apparatus comprising:
   binarization means for binarizing input image input image data;
   selection means for selecting a transfer destination of a binary signal from said binarization means; and
   switching means for switching a binarization mode of said binarization means in accordance with selection by said selection means,
   wherein said selection means selects the transmission of the binary signal from said binarization means to image forming means for forming an image by said binary signal or the transmission of the binary signal to compression means for compressing the binary signal.

3. An image processing apparatus according to claim 1 wherein said processing means includes first half-tone processing means for half-tone processing the image data by utilizing a first threshold matrix, and second half-tone processing means for half-tone processing the image data by utilizing a second threshold matrix different from said first threshold matrix.

4. An image processing apparatus according to claim 3, further comprising discrimination means for discriminating the content of the image data, wherein said processing means further includes non-half-tone processing means for non-half-tone processing the image data, and one of said first and second half-tone processing means and said non-half-tone processing means is selected in accordance with the discrimination result of said discrimination means and the selection by said selection means.

5. An image processing apparatus according to claim 1 further comprising discrimination means for discriminating the content of the image data, wherein said switching means switches the processing mode of said processing means in accordance with the discrimination result of said discrimination means and the selection by said selection means.

6. An image processing apparatus according to claim 5 wherein said discrimination means includes first discrimination means for discriminating the content of the image data by a first method and second discrimination means for discriminating the content of the image data by a second method, and a discrimination result of said first or said second discrimination means is used in accordance with the selection by said selection means.

7. An image processing apparatus according to claim 2, wherein said selection means selects the transmission of the reproduction signal from said processing means to image forming means for forming an image by said reproduction signal or the transmission of the reproduction signal to compression means for compressing the reproduction signal.

8. An image processing apparatus comprising:
   image data input means;
   processing means for processing image data inputted from said image data input means to produce a reproduction signal;
   selection means for selecting a recipient of the reproduction signal from said processing means;
   discrimination means for discriminating the content of the image data input from said image data input means; and
   switching means for switching a processing mode of said processing means in accordance with a discrimination result of said discrimination means and a selection by said selection means.

9. An image processing apparatus according to claim 8, wherein said processing means includes first half-tone processing means for half-tone processing the image data to produce a first reproduction signal, second half-tone processing means for half-tone processing the image data to produce a second reproduction signal and non-half-tone processing means for non-half-tone processing the image data to produce a third reproduction signal, and said switching means is adapted to produce one of said first, second and third reproduction signals in accordance with the selection by said selection means and the discrimination result of said discrimination means.

10. An image processing process according to claim 8, wherein said first and second half-tone processing means half-tone process the image data by using first and second threshold matrixes different from each other to produce first and second binary siganls, respectively.

11. An image processing apparatus according to claim 10, wherein said second threshold matrix is arranged in such a manner that a compression efficiency is not degraded upon compression processing of said second binary signal.

12. An image processing apparatus according to claim 1, wherein said processing means includes binarizing means for processing the image data to produce a binary signal.

13. An image processing apparatus according to claim 3, wherein said first and second half-tone processing means produce respective first and second binary signals and the second threshold matrix is arranged in such a manner that a compression efficiency is not degraded upon the compression processing of the second binary signal.

14. An image processing apparatus according to claim 1, wherein said selection means selects the transmission of the reproduction signal from said processing means to image forming means for forming an image by said reproduction signal or the transmission of the reproduction signal to compression means for compressing the reproduction signal.

15. An image processing apparatus according to claim 8, wherein said selection means selects the transmission of the reproduction signal from said processing means to image forming means for forming an image by said reproduction signal or the transmission of the reproduction signal to compression means for compressing the reproduction signal.

* * * * *

UNITED STATES PATENT AND TRADEMARK OFFICE
CERTIFICATE OF CORRECTION

PATENT NO. : 4,734,784

DATED : March 29, 1988

INVENTOR(S) : KANOU TANAKA

It is certified that error appears in the above-identified patent and that said Letters Patent is hereby corrected as shown below:

COLUMN 1

Line 25, "pixels" should read --pixel--.
Line 39, "the" should be deleted.
Line 66, "other" should read --another--.

COLUMN 2

Line 1, "other" should read --another--.
Line 5, "other" should read --another--.
Line 9, "other" should read --another--.

COLUMN 3

Line 51, "of" should read --for--.

COLUMN 4

Line 4, "valve A" should read --value A--.
Line 21, "semiconductor" should read --a semiconductor--.

COLUMN 5

Line 4, "the case of ③ in" should read --case ③ of--.
Line 9, "scatterd" should read --scattered--.
Line 16, "relection" should read --selection--.
Line 17, "improve" should read --improving--.

UNITED STATES PATENT AND TRADEMARK OFFICE
CERTIFICATE OF CORRECTION

PATENT NO. : 4,734,784  
DATED : March 29, 1988  
INVENTOR(S) : KANOU TANAKA

Page 2 of 3

It is certified that error appears in the above-identified patent and that said Letters Patent is hereby corrected as shown below:

COLUMN 6

Line 4, "the like" should read --like--.  
Line 10, "block" should read --black--.  
Line 11, "impose" should read --produce--.  
Line 11, "affect to" should read --effect on--.  
Line 14, "to" should be deleted.  
Line 17, "configaration." should read --configuration.--.  
Line 35, "affect" should read --effect--.  
Line 46, "runlength" should read --run-length--.

COLUMN 7

Line 29, "light." should read --eight--.  
Line 35, "$M_2N$" should read --MIN--.  
Line 46, "comperes" should read --compares--.

COLUMN 8

Line 10, "then" should read --them--.  
Line 12, "detaile" should read --detail--.  
Line 20, "densites" should read --densities--.

COLUMN 9

Line 10, "to (8n+6)th" should read --to the (8n+6)th--.  
Line 23, "a scope" should read --the scope--.  
Lines 39-40, "input image input image" should read --input image--.  
Line 53, "1 wherein" should read --1, wherein--.

UNITED STATES PATENT AND TRADEMARK OFFICE
CERTIFICATE OF CORRECTION

PATENT NO.   :   4,734,784
DATED        :   March 29, 1988
INVENTOR(S)  :   KANOU TANAKA It is certified that error appears in the above-identified patent and that said Letters Patent is hereby corrected as shown below:

<u>COLUMN 10</u>

Line 2, "1 further" should read --1, further--.
    Line 9, "5 wherein" should read --5, wherein--.
    Line 50, "process" should read --apparatus--.

Signed and Sealed this

Eighteenth Day of October, 1988

Attest:

DONALD J. QUIGG

*Attesting Officer*          *Commissioner of Patents and Trademarks*